(12) United States Patent
King

(10) Patent No.: US 8,135,715 B2
(45) Date of Patent: Mar. 13, 2012

(54) METHOD AND APPARATUS FOR DISCOVERING AND CLASSIFYING POLYSEMOUS WORD INSTANCES IN WEB DOCUMENTS

(75) Inventor: Richard Michael King, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 559 days.

(21) Appl. No.: 11/957,234

(22) Filed: Dec. 14, 2007

(65) Prior Publication Data

US 2009/0157647 A1 Jun. 18, 2009

(51) Int. Cl.
*G06F 17/30* (2006.01)
(52) U.S. Cl. .......................................... 707/737
(58) Field of Classification Search ................. None
See application file for complete search history.

(56) References Cited

U.S. PATENT DOCUMENTS

| | | | |
|---|---|---|---|
| 5,278,980 A * | 1/1994 | Pedersen et al. | 707/999.004 |
| 6,256,629 B1 | 7/2001 | Sproat et al. | |
| 6,886,010 B2 * | 4/2005 | Kostoff | 707/999.003 |
| 7,269,546 B2 * | 9/2007 | Stensmo | 704/9 |
| 7,415,462 B2 | 8/2008 | Bradford | |
| 7,483,892 B1 | 1/2009 | Sommer et al. | |
| 7,562,074 B2 | 7/2009 | Liddell et al. | |
| 7,587,381 B1 | 9/2009 | Remy et al. | |
| 2002/0103799 A1 | 8/2002 | Bradford et al. | |
| 2005/0004930 A1 | 1/2005 | Hatta | |
| 2006/0253439 A1 | 11/2006 | Ren et al. | |
| 2007/0016571 A1 | 1/2007 | Assadian et al. | |
| 2007/0136225 A1 | 6/2007 | Church et al. | |
| 2009/0157390 A1 | 6/2009 | King | |
| 2009/0157648 A1 | 6/2009 | King | |

OTHER PUBLICATIONS

Office Action dated Feb. 3, 2010, in related U.S. Appl. No. 11/957,272, filed Dec. 14, 2007.
Final Office Action dated Jul. 9, 2010, in related U.S. Appl. No. 11/957,272, filed Dec. 14, 2007.
Office Action dated Nov. 23, 2010, in related U.S. Appl. No. 11/957,190, filed Dec. 14, 2007.
Notice of Allowance dated Nov. 24, 2010, in related U.S. Appl. No. 11/957,272, filed Dec. 14, 2007.

* cited by examiner

*Primary Examiner* — Belinda Xue
(74) *Attorney, Agent, or Firm* — Hickman Palermo Truong & Becker LLP

(57) ABSTRACT

A method and apparatus for discovering polysemous words and classifying polysemous words found in web documents. All document corpi in any natural language have words that have multiple usage contexts or words that have multiple meanings. Semantic analysis is not feasible for classifying all word occurrences in all documents on the web, which contain trillions of words in total. In addition, semantic analysis typically cannot distinguish multiple usages of a given meaning of a given word. In one embodiment of this invention, polysemous words in natural languages can be discovered by analyzing the co-occurrence of other words with the polysemous word in web documents. In one embodiment, the multiple meanings and usages of a polysemous word can be determined by analyzing the co-occurrences of other words with the polysemous word. In one embodiment, overcorrelation tables and three-word correlation tables are generated to analyze the words found in web documents.

12 Claims, 11 Drawing Sheets

300

| | |
|---|---|
| FOO | 123 |
| BAR | 1234 |
| MUMBLE | 123 |
| XYZ | 12345 |

303

| | |
|---|---|
| 12345 | XYZ |
| 1234 | BAR |
| 123 | MUMBLE, FOO |

FIG. 3

| 600 | | | |
|---|---|---|---|
| 602 | FENCING : CHAIN | 608 | EPEE/345<br>TOURNAMENT/217<br>. . . |
| 604 | FENCING : BARBED | 610 | CHAIN/4675<br>EPEE/134<br>TOURNAMENT/375<br>. . . |
| 606 | FENCING : EPEE | 612 | TOURNAMENT/375<br>. . . |

FIG. 6

METHOD AND APPARATUS FOR DISCOVERING AND CLASSIFYING POLYSEMOUS WORD INSTANCES IN WEB DOCUMENTS

CROSS-REFERENCE TO RELATED APPLICATIONS

This application is related to U.S. patent application Ser. No. 11/957,190 entitled METHOD AND APPARATUS FOR DISCOVERING AND CLASSIFYING POLYSEMOUS WORD INSTANCES IN WEB DOCUMENTS, filed on even date herewith, by Richard Michael King, the entire contents of which are hereby incorporated by reference as if fully set forth herein.

This application is related to U.S. patent application Ser. No. 11/957,272 entitled METHOD AND APPARATUS FOR DISCOVERING AND CLASSIFYING POLYSEMOUS WORD INSTANCES IN WEB DOCUMENTS, filed on even date herewith, by Richard Michael King, the entire contents of which are hereby incorporated by reference as if fully set forth herein.

FIELD OF THE INVENTION

The present invention relates to techniques for analyzing the content of web documents, in particular, discovering and classifying instances of polysemous words occurring in web documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When a polysemous word is submitted to a query engine, under current approaches, the query engine will return search results linking to documents associated with all the meanings of the polysemous word. The user is left to rummage through the search results to locate the type of documents relating to the intended meaning of the words in his search.

For example, suppose the word "fencing" is queried. Fencing is either a sport, a structure to delineate a land boundary, or the act of selling stolen goods. In prior searching approaches, hyperlinks to web pages relating any or all of the three meanings would be returned to the user.

In an approach, other words that are frequently submitted with the target word are suggested to the user to narrow the search. These query extensions are determined from analyzing past query data. For example, a user who once submitted the query "fencing" and desired results relating to "fencing" as a sport may have been dissatisfied with broad search results. Such a user would submit a follow-up query, "fencing epée," in order to narrow the results returned by the search engine. If this search pattern is repeated over many submissions, the second query, "fencing epée," becomes strongly associated with the first query, "fencing," and will be returned to the user as a suggested narrowing query.

Because a search engine may require six months' collection, or more, of query submission data for such correlations to propagate through the search engine, it is not desirable to detect and classify correlations of polysemous words by accumulating query data from real user queries.

Advertisers who target advertisements to users depending on the terms used in a particular query also encounter problems with polysemous words. In a past approach, advertisements provided to a user may not correlate with the interests of the user because a query consisted of a polysemous word. An inappropriate advertisement would displace appropriate ones. In the prior approach, in order to ensure that an advertisement was presented to the correct audience, advertisers needed to specify particular conjunctive keywords in queries that trigger the display of an advertisement. A supplier of sport fencing goods would explicitly specify, for example, "fencing epée," "fencing sabre," "fencing foil," and "fencing tournament" as the queries which would trigger a display of fencing advertisement.

However, advertisers are not able to predict all the variations of queries submitted by users who may be interested in the advertisers' goods, and would thereby miss key opportunities to display advertising to an ideal audience. For example, when fencer Mariel Zagunis won the gold medal in the 2004 Olympic Games, an event that may have created an overnight surge of queries on her name, it would have been desirable for sport fencing advertisement to be displayed in conjunction with the queries having her name together with the word "fencing." In a previous approach, sport fencing advertisers would have needed to add "Mariel" and "Zagunis" to a search engine's keyword list in order for advertisements to be displayed in response to a query of the name. Such manual tracking of keywords is time-consuming and should be avoided. Based on the foregoing, there is great need to be able to automatically and quickly update a search engine with newly correlated words of polysemous words.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a table that is generated by an embodiment of the invention that shows the frequency of the occurrence of words among the documents.

FIG. 6 is a flow diagram that illustrates a curried intracorrelation table, according to one embodiment of the invention.

DETAILED DESCRIPTION

Figure 1:
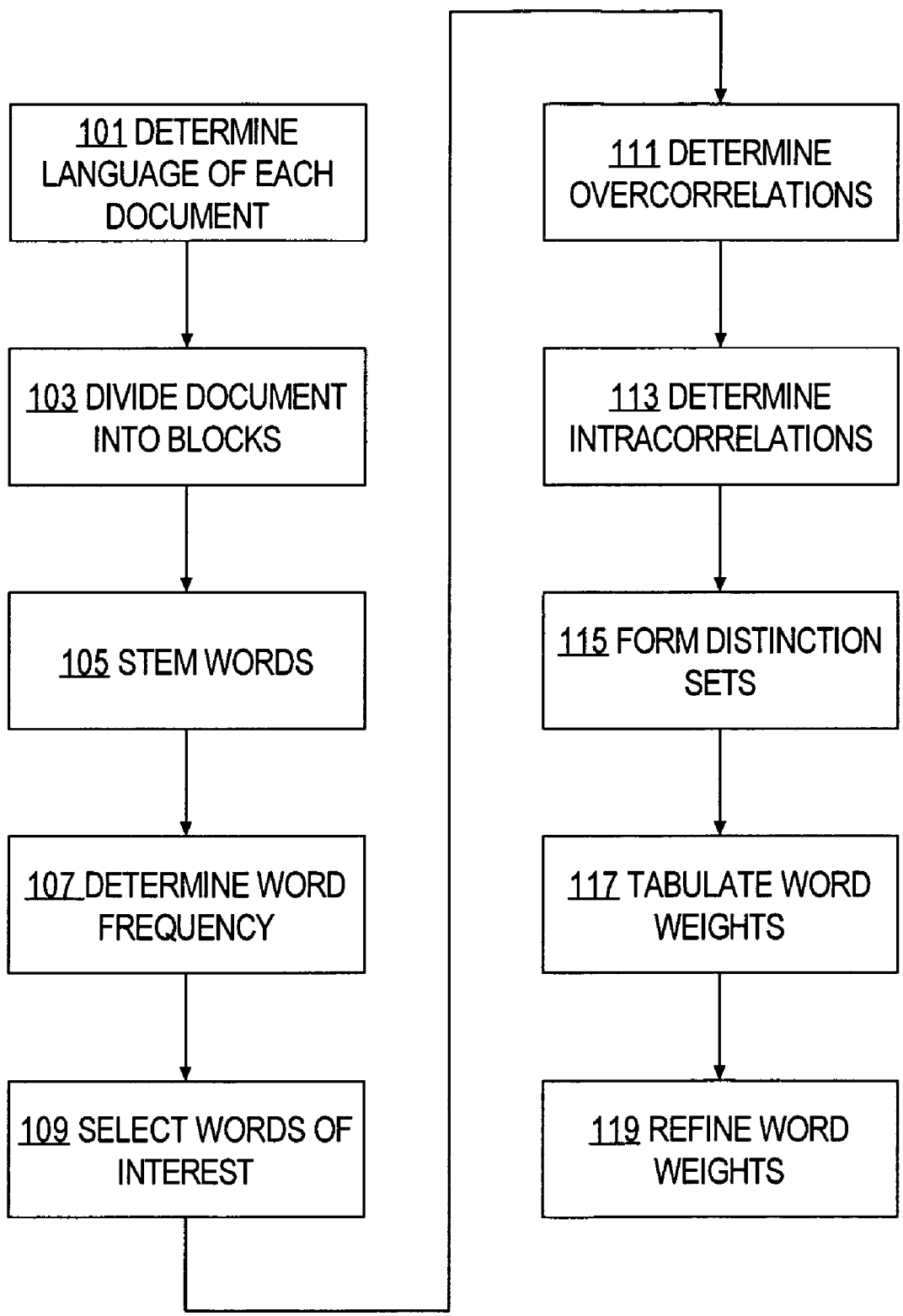
FIG. 1 is a flow diagram that illustrates an embodiment of the invention for discovering and classifying polysemous words.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for analyzing web documents, in particular a computer system for automatically detecting and classifying polysemous words in web documents.

Words with multiple usage contexts or multiple meanings are called polysemous words. Polysemous words can also be conceptualized as multiple words with identical orthography. For example, one word, written as "saturn," describes a planet. Another word, also written as "saturn," describes a make of car. Yet another word, "saturn," describes a video game.

A particular web document relating to Saturn, the planet, would often contain correlated words like "Mars," "Jupiter," "Mercury," "Cassini," or "Titan," in addition to "Saturn." Another document relating to Saturn, the car company, would contain correlated words like "Ford," "Chrysler," and "Mercury." Finally, a document relating to Saturn, the video game console, would contain correlated words like, "Sega," and "Nintendo."

Determining different usage contexts of a word is as significant as determining different meanings of the word because the distinction is significant to a user, who is typically interested in documents related to only a particular usage or meaning of the word. For example, "belay," which means to apply friction to a rope, is used in the context of rock climbing, or in the context of sailing. A user submitting a query "belay" is typically seeking documents relating to just one of the usages. In one embodiment of the invention, words will be classified based on any usage or meaning by which they can be distinguished.

In one embodiment of the invention, the meanings of word instances within a document are determined without conducting semantic analysis of the words. While semantic analysis is a possible solution to the problem of detecting and classifying polysemous words and the documents which contain them, such programs require substantial execution time. Not only is semantic analysis on each of the trillions of instances of words in documents indexed by a search engine not feasible, but semantic analysis would be limited to distinguishing words based on meaning alone because such programs are typically unable to determine different usage contexts of a word.

Detecting and Classifying Polysemous Words

In one embodiment of the invention, the meaning of a polysemous word as used in any particular document can be determined by the occurrence of other words in the document. In other words, a word's meaning is determined from the words that co-occur with it. Given a target word to be analyzed, across many web documents, certain words would tend to appear with the target word in more documents than other words. For example, given a target word "saturn," it has been determined from analyses of data collected from web documents that "car," "nasa," "sega," "titan," "coupe," "video," "mercury," and "shooter" appear more frequently in documents with the word "saturn" than in the general document population. These words are said to overcorrelate with "saturn." From among the group of overcorrelated words, it can be determined the degree to which the overcorrelated words appear with each other, given the target word. This is referred to as an intracorrelation among the targetword-correlatedword-correlatedword trio. Those words that are highly intracorrelated are clustered together. The clusters form distinction sets. In one embodiment, the distinction sets may connote a meaning or usage of a target word. For example, the words {nasa, titan, mercury}, {car, coupe, mercury}, and {sega, video, shooter} connote the usages of "saturn" in the context of astronomy, automobiles, and video games, respectively. Certain words may cluster with two distinction sets. For example, the word "mercury" has strong support for the astronomical usage, weak support for the automotive usage, and no support for the video game usage of the target word "saturn."

By this method, the word "saturn" is detected to be polysemous, and documents containing "saturn" can be classified based on whether it has any of the clusters of words intracorrelated with "saturn."

FIG. 1 is a flowchart that illustrates an embodiment of the invention for discovering and classifying polysemous words. Certain steps will be described in more detail in sections that follow. Step 101 comprises determining the language for each document from various indicators. According to one embodiment, the documents whose language cannot be determined are removed from analysis. Once the language of each document, or the host document language, has been determined, all words of a particular document are analyzed as being from the host document language, regardless of whether a particular word is of another language. Although the following examples illustrate discovering and classifying polysemous words for documents of one particular language, in another embodiment of the invention, the discovering and the classifying of polysemous words are performed in parallel on documents of all languages, whereby results of the analyses of each polysemous word are grouped according to the language of the host document of each word. In another embodiment of the invention, documents of all languages are analyzed simultaneously.

At step 103, each web document in the group of documents to be analyzed is divided into blocks of a particular quantity of words. At step 105, according to one embodiment, the words of each block can be stemmed, and each block is stripped of any duplicated words and any numerals, leaving only a set of unique words in the block. Stemming a word involves reducing a word to its root form. According to one embodiment, "fencing" is stemmed to its root form, "fence."

At step 107, for each word in the set of all words contained in all documents, the quantity of blocks in which a particular word is found is determined, and the results are tabulated for all words. These quantities constitute the word frequency data, organized in a word frequency table. In one embodiment, stop-words (i.e., "the," "of," and "by,") that do not give any particular meaning to a web document are removed from consideration. At step 109, from the word frequency table, a particular quantity of words that appear more frequently than the rest of the words are deemed "words of interest" that are further analyzed. At step 111, overcorrelation tables are generated, wherein each table indicates the amount of overcorrelation of all words of interest against a particular target word. At step 113, for each table associated with a particular target word, a particular quantity of words that are the most highly overcorrelated are analyzed for their intracorrelations with one another. At step 115, the intracorrelations are analyzed, and the highly overcorrelated words are clustered into distinction sets. At step 117, based on the meanings determined by the clustering, weights relative to each meaning are assigned to each of the highly overcorrelated words. The words, and the weights that are relative to each meaning, are organized into a word/meaning weight table. At step 119, the word weights are refined until the system has reached stability.

As previously mentioned, separate word frequency tables, overcorrelation tables, intracorrelations, the distinction sets, and word/meaning weight tables are developed for the documents of each language determined at step 101.

Dividing Documents into Blocks

Figure 2:
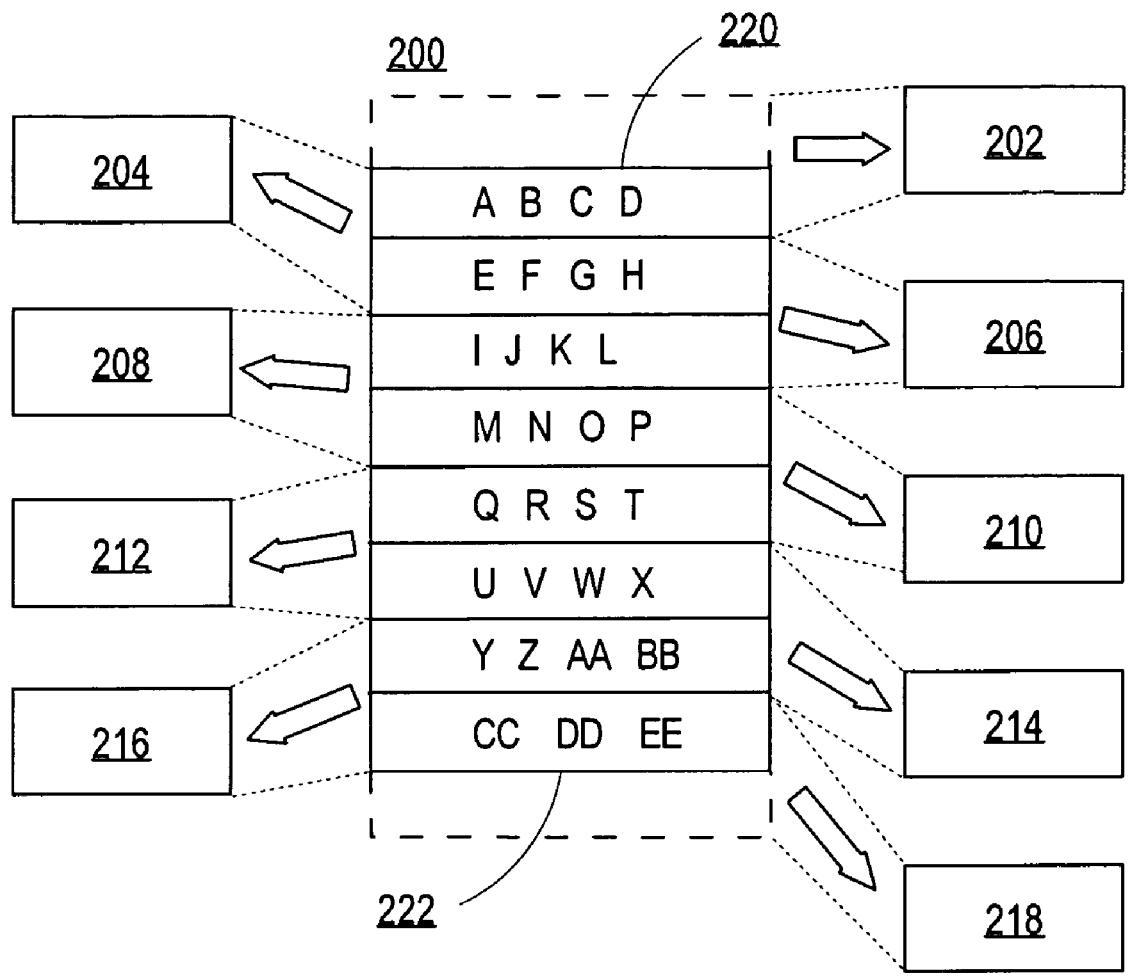
FIG. 2 is a block diagram that illustrates dividing a document into blocks, according to one embodiment of the invention.

Dividing a document into smaller documents, referred to herein as "blocks," improves the accuracy of the method for reasons that will be evident below. Referring to FIG. 2, in one embodiment of the invention, a document 200 is partitioned into blocks 202-218. Each of the blocks of words comprises up to a certain maximum quantity of words, which is constant for any particular embodiment of the invention. According to one embodiment, each of blocks 204-216 comprises two hundred words in length, with the exception of the first block 202 and the last block 218. In one embodiment, the documents that were analyzed for one particular language generated about 500 million blocks of two-hundred words in length. Conceptually, the first block 202 begins a half-length before the beginning 220 of the document. The last block 218 ends after the end of the document 222. Blocks 202-218 are generated so that they overlap, or "shingle," such that the last half of one block is the same as the first half for the following block. Thus, adjacent blocks 202 and 206 share a common boundary, whereas adjacent blocks 204 and 208 share another common boundary that maps to a point at the middle of block 206. Where each word of a pair of overcorrelated words appears on either side of the boundary of two adjacent blocks, shingling is necessary to capture both words within one block so that their co-occurrence is counted.

When blocking or shingling is performed on the documents, a short document that is less than a half-block in length is still divided into two blocks, where each of the overlapping blocks contains all the text. For example, if document 200 were truncated to be a short document that included only the words "A B C D," then document 200 would be divided into block 202 and block 204. Another consequence of blocking and shingling is that each word is always counted as occurring in two blocks, such as word "K," which is included in block 206 and block 208. Two words that are located close together, like word "N" and word "O," are likely co-occur in two blocks, like block 208 and block 210. Two words that are located about a half block's width apart, like word "F" and word "K," are likely to co-occur in one block, block 206. Finally, two words that are located farther than a block's width apart, such as word "T" and word "Y," do not co-occur in any block, and thus would not affect any correlation analysis.

Dividing a document into blocks offsets idiosyncrasies found in certain documents which would otherwise skew the overcorrelation analysis if the documents were not divided before analyzing them. For example, a long document may produce quadratically more pairs of words than a shorter document. Because the process of determining a correlation ratio for a target word and another word involves analyzing pairs of words on a web page, analyzing a long document in the same manner as a short document would produce an unbalanced influence on the results. Also, there exist many "pathological" documents on the web, for example, documents consisting entirely of a listing of all possible combinations of words of a certain length using the Roman alphabet. Additionally, weblogs, or "blogs," which are websites where users post informal journals of their thoughts, comments, and philosophies, pose special problems because of their structure. Several blog entries about different subjects can appear on a single web page. A single blog web page can contain a polysemous word that has been used in several contexts over several blog entries. Thus, analyzing such a blog web page as one document would lead to inaccurate correlation results. Dividing the blog into blocks would alleviate the inaccuracy.

For each block, any duplicates of any word in each block, as well as all numeral strings, are removed. In one embodiment, certain blocks are reduced to one word in length because the web document which produced the block contained a word that was repeated, with the repetitions exceeding the length of a block. If a block originally contained all numerals, the block would reduce to no words.

Word Frequency Tables

Referring to FIG. 3, in one embodiment, from the blocks of unique words, a table 300 of all words is generated, with each row of the table consisting of a word and the number of blocks in which the word is found, denoting the word's frequency of occurrence among the blocks. In one embodiment, the word frequency table is inverted, so that the frequency counts become the keys and the words become the values. In one embodiment, the inverted table 303 is sorted. From the inverted table, the most common words, such as articles, conjunctions, prepositions, and other "stop words," are removed from consideration. These words are so ubiquitous that they do not help to distinguish the meanings of other polysemous words. The inverted table is used to generate a second inverted word frequency table, consisting only of the words with the sixty-four thousand highest frequency counts. In one embodiment, those sixty-four thousand words are the "words of interest" that will be further analyzed as target words by the system.

Overcorrelation Tables

In one embodiment, there are B(l) blocks in language l. Words w1 and tw, both in language l, occur in C(w1) and C(tw) blocks. Thus, the proportion of blocks having w1 or tw can be expressed as:

$$P(w1) = \frac{C(w1)}{B(l)} \quad P(tw) = \frac{C(tw)}{B(l)}$$

Probabilistically, if the occurrences of w1 and tw were neither positively nor negatively correlated, the predicted proportion of blocks having both w1 and tw should be the product of the two proportions:

$$\text{Predicted Proportion} = P(w1) \times P(tw)$$
$$= \frac{C(w1)}{B(l)} \times \frac{C(tw)}{B(l)}$$
$$= \frac{C(w1)C(tw)}{B(l)^2}$$

The predicted proportion, multiplied by the total number of blocks examined, yields the count of blocks predicted to have the co-occurrences:

$$\text{Predicted Count} = \frac{C(w1)C(tw)}{B(l)^2} \times B(l)$$
$$= \frac{C(w1)C(tw)}{B(l)}$$

The overcorrelation, or correlation ratio, of a correlated word w1 with a target word tw is the ratio between the actual co-occurrence proportion and the predicted co-occurrence proportion. The actual co-occurrence proportion, P(w1|tw), is determined by counting the number of blocks that contain a certain pair of co-occurring words, C(w1|tw), divided by the total number of blocks examined, B(l). The predicted co-occurrence proportion is calculated from the product of the respective proportions of the blocks having of each word, P(w1) and P(tw). This calculation is expressed by the following equations:

$$\text{Overcorrelation} = \frac{P(w1 \mid tw)}{P(w1) \times P(tw)}$$
$$= \frac{\frac{C(w1 \mid tw)}{B(l)}}{\frac{C(w1)C(tw)}{B(l)^2}}$$
$$= \frac{C(w1 \mid tw)}{\frac{C(w1)C(tw)}{B(l)}}$$
$$= \frac{\text{Actual}(w1 \mid tw)}{\text{Predicted } C(w1 \mid tw)}$$

Thus, the overcorrelation of w1 and tw is the actual count of blocks with co-occurring w1 and tw, divided by the predicted count of blocks with co-occurring w1 and tw.

Figure 4:
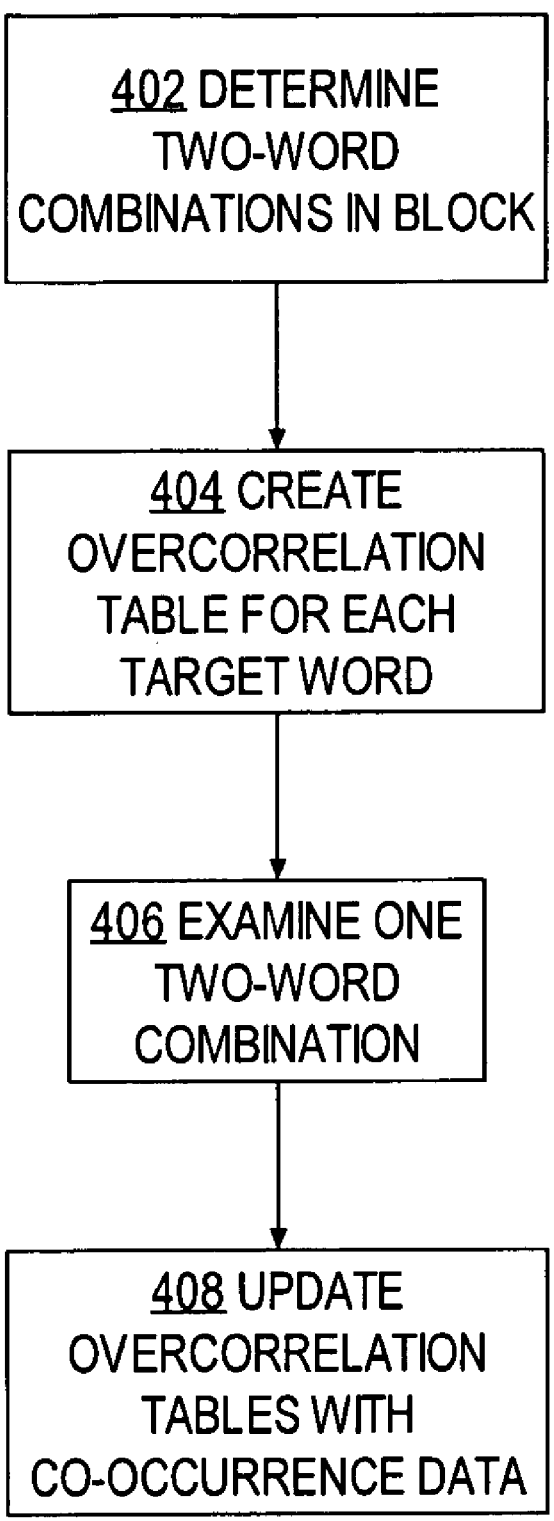
FIG. 4. is a flow diagram that illustrates the steps performed according to one embodiment for producing overcorrelation tables.

Referring to FIG. 4, flowchart 400 illustrates the steps performed according to one embodiment for producing overcorrelation tables. The steps are repeated for each of the 500 million blocks in the corpus. At step 402, the system examines a block, and determines all the two-word combinations of words in the block. At step 404, the system creates an overcorrelation table for every target word. Every overcorrelation table for a target word has a column of all words found to co-occur with the target word in any block, and a column that is related to the quantity of blocks that contain the target word and a particular word. At step 406, the system examines a pair of words. At step 408, the overcorrelation table for each word is updated with the incremented count of the other word in the pair. For example, for the pair {Saturn; nasa}, the "nasa" record in the "saturn" table is incremented, and vice versa.

Because in some embodiments the steps are performed on a distributed system, each incremental update of a table needs to be communicated through the system. For a corpus of approximately 500 million blocks to be analyzed, a total of approximately 10 trillion pairs of words will be examined by the system. Thus, according to one embodiment, 20 trillion communications are needed to produce the overcorrelation tables.

If a value of the overcorrelation for the corresponding word pair were incremented for each co-occurrence, the communication would be large, and much more communication would be needed than is ideal. Furthermore, much more disk space than is ideal would be needed on the machines that discover co-occurrences, because records describing co-occurrences are staged before they are merged into co-occurrence data for a particular word pair. According to one embodiment, in order to minimize the storage space necessary for the tables, the overcorrelation ratio is normalized to a selected par value p (e.g., 1000). The par value relates to the overcorrelation in that if the actual co-occurrence counts equal the predicted co-occurrence counts, then the normalized overcorrelation equals the par value. If the actual co-occurrence counts exceed the predicted co-occurrence counts, then the normalized overcorrelation is greater than the par value. If the actual co-occurrence counts are less than the predicted co-occurrence counts, then the normalized overcorrelation is less than the par value.

Next, a factor is determined based on the par value and the predicted co-occurrence counts. When the factor is multiplied by the actual co-occurrence counts, the normalized overcorrelation is directly derived from this operation. Thus, each of the possible two-word combinations formed from the 64,000 words of interest corresponds to a factor that is derived from the selected par value and the predicted co-occurrence counts.

According to one embodiment, in order to simplify the calculation, storage, and retrieval of the factors for each word pair, the factor is broken up into two component factors, F(word). Each of the component factors, F(w1) and F(tw), is based on only the total number of blocks in that particular language l, B(l), and the individual occurrence counts of words, C(w1) and C(tw), as shown in the following example. Thus, each of the component factors can be stored with a word of interest, of which there are 65,536, instead of with a pair, of which there are over 2 billion, greatly reducing the size of the data structure that is maintained. The two factors can be multiplied to produce the original factor, as illustrated by the following equations.

$$F(\text{word}) = \frac{\sqrt{pB(l)}}{C(\text{word})}$$

$$\text{Original Factor} = \frac{p}{\text{Predicted } C(w1 \mid tw)}$$
$$= \frac{p}{\frac{C(w1)C(tw)}{B(l)}}$$
$$= \frac{pB(l)}{C(w1)C(tw)}$$
$$= \frac{\sqrt{pB(l)}}{C(w1)} \times \frac{\sqrt{pB(l)}}{C(tw)}$$
$$= F(w1) \times F(tw)$$

$$\text{Overcorrelation} = \sum_{k=1}^{C(w1\mid tw)} F_k(w1) \times F_k(tw)$$

According to one embodiment, overcorrelations for all words of interest are tabulated in parallel by a cluster of computer systems in the following manner. First, a particular block is examined to determine all possible two-word combinations from the words in the block. For each two-word combination, a first factor, F(tw), that is associated with the first "target" word is multiplied by the second factor, F(w1), that is associated with the second "correlated" word. For this calculation, each of the two words is a target word with respect to the other.

According to one embodiment, a particular value in the overcorrelation tables that are kept for each of the words is incremented by the product of F(w1) and F(tw). For example, in preceding embodiment, in the overcorrelation table for w1, a value corresponding to an entry for tw is conceptually incremented by the factor. In other words, for each block that includes both w1 and tw, the co-occurrence is marked by incrementing the words' respective overcorrelation tables and entries. When all blocks have been processed, the values that result in each entry for each overcorrelation table is the normalized overcorrelation of the correlated word with the target word. Thus, this normalized overcorrelation is derived by incrementing a value by the factors for each counted co-occurrence of the two words, as shown by the following equation:

$$\text{Overcorrelation} = \sum_{k=1}^{C(w1|tw)} F_k(w1) \times F_k(tw)$$

Probabilistic Co-Occurrence Counting

In one embodiment, the processing of the blocks to create the overcorrelation tables is implemented in the MapReduce software framework, wherein large clusters of computers are used in parallel to complete the processing. According to one embodiment, the documents on the world wide web that are examined produce 500 million blocks. The 500 million blocks result in approximately 10 trillion word pairs whose co-occurrences need to be counted. Building the overcorrelation tables that tabulate each co-occurrence would appear to require sending at least 10 trillion communications through the system. It is impractical to provide the bandwidth required to communicate the results of 10 trillion examinations in a reasonable amount of time.

According to one embodiment, in order to reduce the bandwidth necessary to produce the overcorrelation tables, the concept of probabilistic co-occurrence counting is introduced. The above-highlighted method of producing the overcorrelation tables is modified so that fewer communications are sent through the system.

For example, suppose the factor F(w1)×F(tw) is 0.3 for a particular pair of words. In the above-described embodiment, for each occurrence of a pair of words in the blocks, the factor of 0.3 will be sent through a MapReduce framework and then summed to build the overcorrelation tables. Under an embodiment that uses probabilistic co-occurrence counting, instead of sending a value of 0.3 for each co-occurrence of the particular pair in of any of the blocks, a count of 1 is sent for 30 percent of the co-occurrences. The sum of 1s that are sent 30 percent of the time is probabilistically equal to the sum of sending 0.3 every time. However, because the system is distributed, and many other blocks may be processed before the system encounters a particular pair of words again in a subsequent block, the system does not retain a memory of the pairs of words encountered. Accordingly, the system cannot simply send three 1s for every ten occurrences because such tracking of the occurrences would require the very operation to be avoided, i.e., communicating many values through a system.

One of the possible tools that can be used to facilitate the probabilistic generating of 1s is a random number generator. Certain random number generators (RNGs) will generate over time a set of floating point numbers that are uniformly distributed between 0 and 1. Thus, the probability that the RNG will generate a number that has a fractional part x, where 0<x<0.3, is 0.3, or 30 percent.

Figure 5:
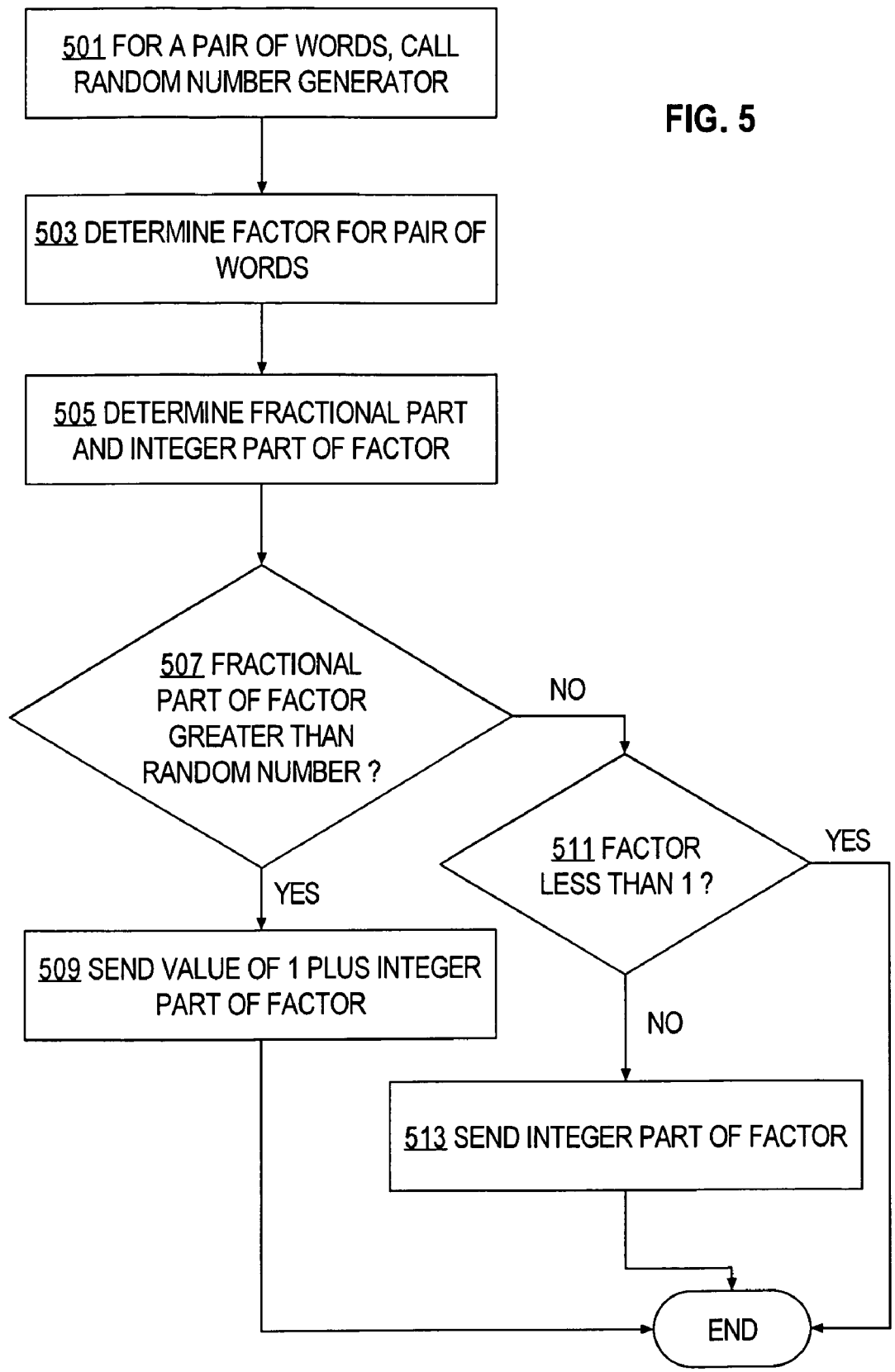
FIG. 5 is a flow diagram that illustrates the steps for performing probabilistic co-occurrence counting using a random number generator, according to one embodiment of the invention.

The built-in probabilistic nature of numbers generated by an RNG is used to achieve probabilistic co-occurrence counting of words in a plurality of documents. Referring to FIG. 5, at step 501, as each pair in a block is determined and examined, a call is made to an RNG. At step 503, for each pair of words w1 and tw, the words' factor is determined by the product F(w1)×F(tw). In one embodiment, F(w1) and F(tw) are stored with w1 and tw, respectively, in a data structure within the overcorrelation engine.

Referring to the set of equations showing the derivations of the factors, $$\text{Original Factor} = \frac{1000}{\text{Predicted } C(w1|tw)}$$
$$= F(w1) \times F(tw)$$

Thus, according to this embodiment of the invention, only word-pairs that are predicted to co-occur in fewer than 1000 blocks among the corpus of 500 million blocks have a factor greater than 1.0. According to one embodiment, the number 1000 is chosen to be the scaling factor in part because a vast majority of the words w1 and two are predicted to co-occur in greater than 1000 blocks.

At step 505, the factor is split into its integer and fractional part. At step 507, it is determined whether the fractional part of the factor is greater than the random number. If so, at step 509, a value of 1 plus the integer part of the factor is sent through the MapReduce framework to build the words' respective overcorrelation tables. If not, then at step 511 it is determined whether the factor is less than 1.0. If so, no data whatsoever is sent over the MapReduce framework. If at step 511, the factor is greater than or equal to 1.0, then at step 513 the integer part of the factor alone is sent over the MapReduce framework. For factors less than 1.0, because the probability that a value of 1 is sent to the overcorrelation tables is equal to the factor, the sum of the 1s that are sent at step 511 will approximately equal the sum of the factors. Accordingly, probabilistic co-occurrence counting produces the same effective result as direct co-occurrence counting, but reduces the bandwidth required for counting the pairs of words whose factor is less than 1.0. According to one embodiment, counting by probabilistic co-occurrence counting provides the benefit of sending only integers through the MapReduce framework.

To maximize the bandwidth-reducing benefits of probabilistic co-occurrence counting, the vast majority of word pairs in one embodiment of the invention should have factors less than 1.0. Accordingly, the scaling factor for one embodiment of the invention is set to 1000. The more a word pair is likely to co-occur, the smaller the factor will be and the larger will be the percentage by which communications are reduced. According to one embodiment, it is determined that the words which co-occur most often have factors smaller than 0.001.

Intracorrelation

Next, the overcorrelation tables for all the target words are used to develop curried intracorrelation tables between a target word and a pair of the target words' highly overcorrelated words. In one embodiment, the intracorrelation between a target word tw, a first highly overcorrelated word w1, and a second highly overcorrelated word w2, is the ratio between the actual proportion of blocks having of the trio of words, divided by the predicted proportion of blocks having the trio of words.

$$\text{Intracorrelation} = \frac{\text{Actual proportion}}{\text{Predicted proportion}}$$
$$= \frac{P((tw|w1)|w2)}{P(tw|w1) \times P(tw|w2)}$$

In one embodiment, the top two hundred fifty-six overcorrelated words from each of the 64,000 overcorrelation tables are analyzed to determine their intracorrelation. The process for discovering the intracorrelations is similar to the process for discovering overcorrelations. The predicted proportion of blocks having the trio is the product of the two predicted proportions of blocks having a co-occurrence of a target word with one of the two highly overcorrelated words, P(w1|tw) or P(w2|tw). In one embodiment, the predicted proportion is derived based on the values from the overcorrelation table built for the particular target word tw.

Similar to the process for determining overcorrelations, the actual co-occurrence counts for a trio of words is produced through summing a factor that is associated with a particular trio. In one embodiment, the summing of the factors is again achieved by using the MapReduce framework and the probabilistic co-occurrence counting framework.

The computations result in producing 64,000 matrices of 256×256 words, with one matrix for each of the target words. Each trio {tw1|w1|w2} is associated with a normalized intracorrelation value. Similar to the overcorrelation values, in one embodiment, the intracorrelation values are scaled to 1000 such that if a particular trio of words co-occur in exactly the same number of blocks as was predicted, then the intracorrelation value with respect to the trio is 1000.

FIG. 6 illustrates an abbreviated curried intracorrelation table according to one embodiment of the invention. A curried intracorrelation table maps a target word and one overcorrelated word to the set of other overcorrelated words for which an intracorrelation has been determined. In table 600, each record represents an intracorrelation between the pair of words in the first field of the row with words in the second field of the row. Referring to the first row, "fencing" is the target word. "Chain" is the overcorrelated word. The "fencing:chain" word pair is stored as a key in the intracorrelation table. After another round of probabilistic co-occurrence counting for the "fencing:chain" word pair, the 256 most intracorrelated words are stored in field 608, along with their intracorrelation values, scaled to 1000. In table 600, "epée" and "tournament" are found to be slightly intracorrelated with the word pair "fencing:chain," with intracorrelation values of 345 and 217, respectively.

Figure 7:
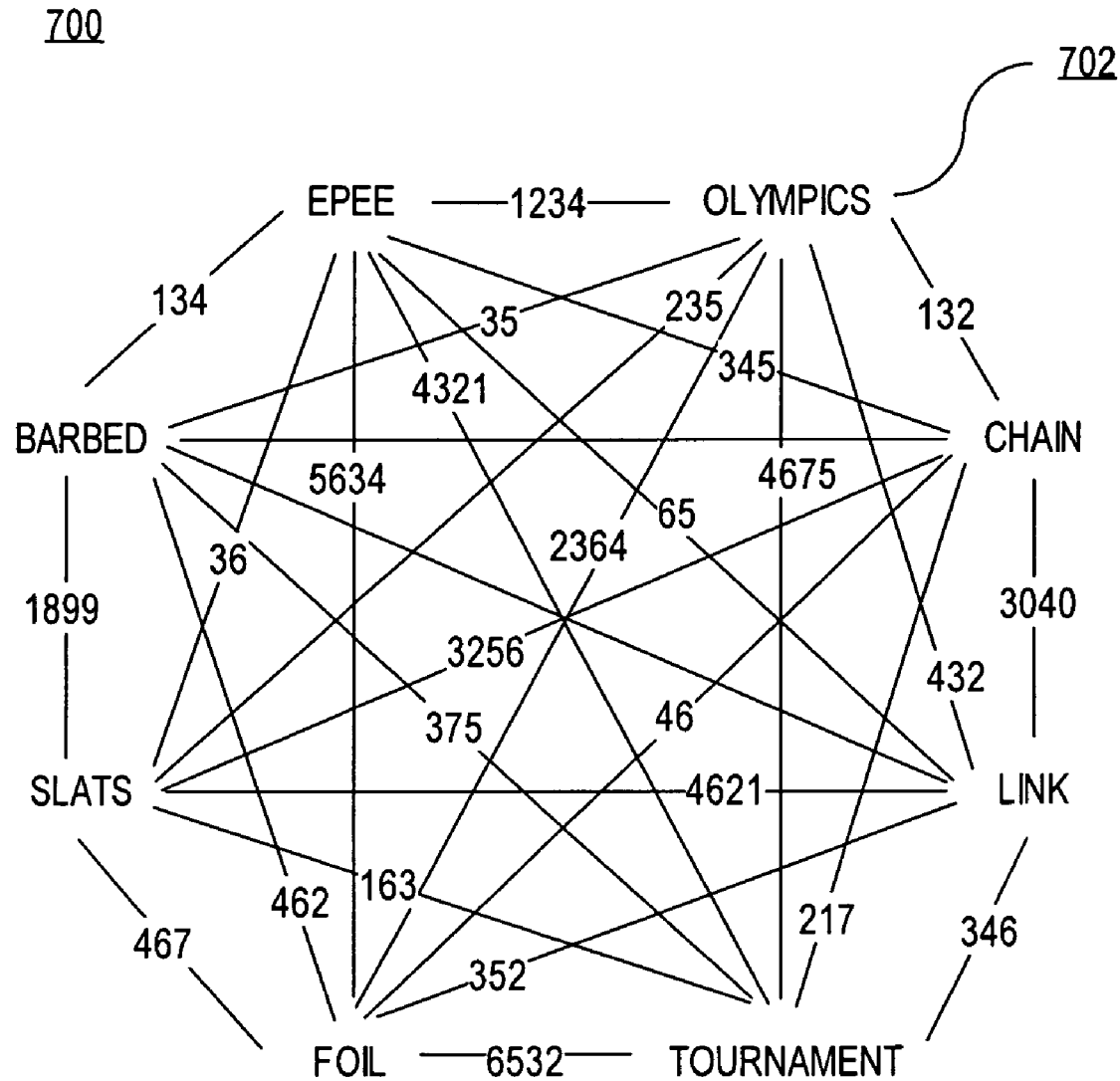
FIG. 7 is a diagram in the form of a complete graph that shows intracorrelations between the highly overcorrelated words of a particular target word according to one embodiment of the invention.

Referring to FIG. 7, a complete graph 700 is built from each of the matrices for each target word. Node 702 represents one of the target word's highly overcorrelated words. Because a particular matrix for a particular target word has 256 highly overcorrelated words that were intracorrelated, a complete graph for the particular target word will have 256 vertices, or nodes. The intracorrelation values between a particular pair of highly overcorrelated words are represented as the weights of the arcs between any two nodes.

For each target word, the nodes of the complete weighted graph associated with the target word are clustered and merged according to clustering algorithms. In one embodiment, the pair of overcorrelated words that is connected with the greatest weight is merged together, forming a cluster. The weights between other nodes that have arcs to either of the merged nodes are recalculated by weighted averaging.

The clustering continues until certain conditions are met with respect to the state of the clustered graph. In one embodiment, the clustering stops when the adjusted weights between merged nodes are all lower than a certain threshold weight, or lower than the average weights of the graph edges that have been subsumed into the clustered nodes. Clusters containing fewer than a certain number of words are ignored.

Discover Distinction Sets

The clustering produces distinction sets of clustered words. A particular distinction set for a particular target word is a set of correlated words, whose grouping is presumed to distinguish one meaning of the target word from other meanings of the target word. In the execution of an embodiment of the invention, the following distinction sets for the target word "fencing" are found: {epée, olympics, foil, tournament}, and {barbed, slats, chain, link}. The words in the distinction sets label the results of the clustering. The possible meanings and usage contexts of a target word are thus derived from the distinction sets, without performing any semantic analysis. Classifications of documents relative to a target word are based on the distinction sets for that target word.

Word Weights Table

From the distinction sets for each of the 64,000 target words, a word weights table is formed. A word weights table for a particular word has a column of all the highly overcorrelated words, and a plurality of columns of weights, wherein each column of weights represents a meaning of the target word that was determined through the clustering. For each highly overcorrelated word, a set of initial weights is assigned to each column of meaning. 1.0 is assigned to the column for the word's cluster, and $-1/(n-1)$ is assigned to the remaining columns, where n is the number of clusters. Note that this assignment gives a total weight of 0.0.

Figure 8A:
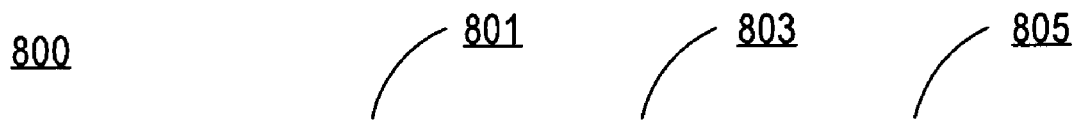
FIG. 8A is a table of a set of highly overcorrelated words, and certain weights relating to particular meanings of a target word, according to one embodiment of the invention.

Referring to FIG. 8A, which illustrates a simplified example of the word weights table for the target word "saturn" for an embodiment of the invention, the table 800 has three columns 801, 803, and 805. Each of the columns corresponds to distinction sets formed through the clustering. Initial weights are assigned for each row depending on the distinction sets in which they belong. For example, the first row, corresponding to the key "nasa," is assigned a word weight 1.0 in column 803, and −0.5 for columns 801 and 805, for a total sum of 0 across the row.

Refining Word Weights

Figure 8B:
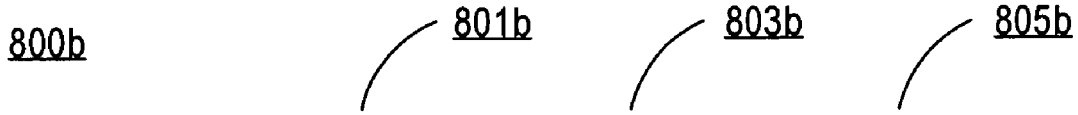
FIG. 8B is a table of a set of highly overcorrelated words as it appears after the certain weights are refined, according to one embodiment of the invention.
Figure 9:
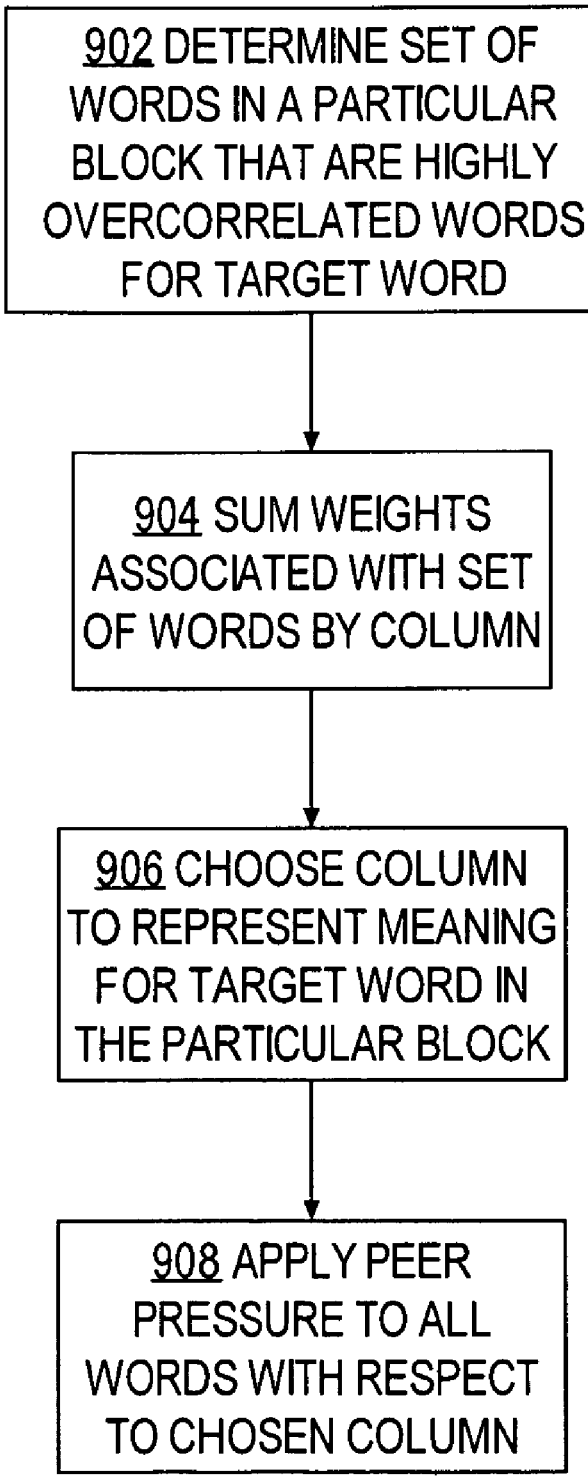
FIG. 9 is a flow diagram that illustrates a process for refining the weights in a particular word weights table according to one embodiment of the invention.

The word weights table for each of the target words are refined. The refining allows the system to fine-tune relationship between each of the intracorrelated words and its presumed meaning that resulted from the clustering. The process of refining produces the refined word weights table as shown in FIG. 8B, according to one embodiment of the invention. Referring to FIG. 9, the flowchart illustrates a process for refining the weights in a particular word weights table according to one embodiment of the invention. For each block that contains a particular target word, a meaning is determined for the target word in the block by reference to the word weights table for the target word. At step 902, a subset of words in the block that are part of the set of 256 most highly overcorrelated words in the word weights table for the target word is determined. At step 904, for each column of the table, the weights corresponding to the subset of words are summed. The column that yields the most weight by a sufficient margin is chosen at step 906 to represent the meaning of the target word in that particular block. At step 908, for the weights of each overcorrelated word in the word weights table that correspond to the words of the subset, the weights in the chosen column are increased, and the weights in the other columns are decreased, thus applying "peer pressure" to the weights. However, as shown in table 800b, weights cannot increase above 1.0 or decrease below −1.0, and the constraint that the sum of the weights equals 0.0 is maintained. When the process is completed, the word weights table for a target word will reveal which meaning of the target word that a particular overcorrelated word strongly or weakly supports.

Hardware Overview

According to an embodiment, the approaches described may be implemented on a clustered computer system. A clustered computer system comprises a set of interconnected computing elements herein referred to as nodes. The nodes in a clustered computer system may be in the form of computers (e.g. work stations, personal computers) interconnected via a network. Alternatively, the nodes may be the nodes of a grid. A grid is composed of nodes in the form of server blades interconnected with other server blades on a rack. Each server blade is an inclusive computer system, with processor, memory, network connections, and associated electronics on a single motherboard.

Figure 10:
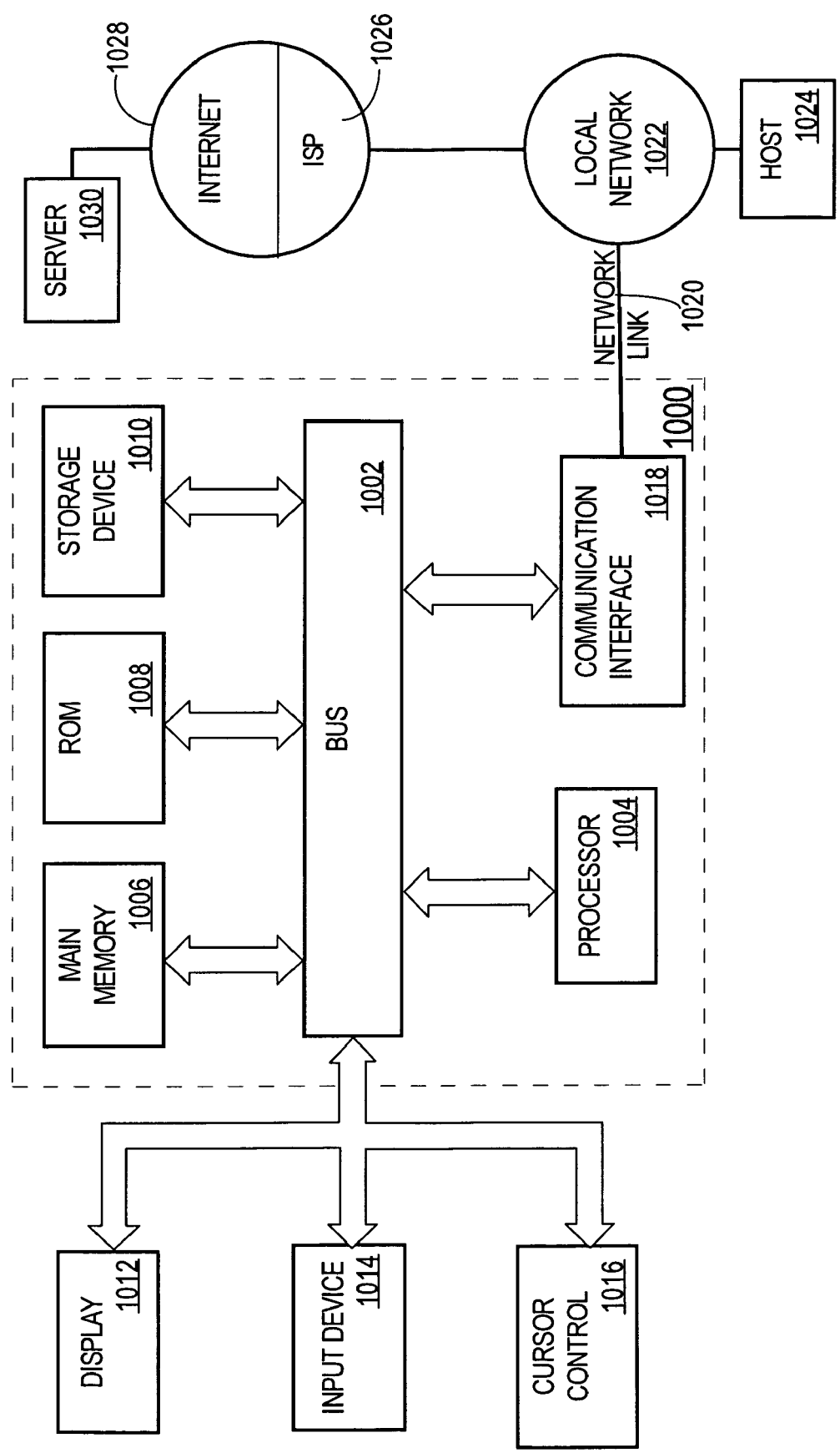
FIG. 10 is an example computer system, according to one embodiment of the present invention.

Referring to block diagram FIG. 10, a node of a clustered computing system upon which one embodiment of this invention may be implemented is illustrated as computer system 1000. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to storage media and transmission media. Storage media includes both non-volatile media and volatile media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, the method comprising steps of:
   for each target word of target words, determining a set of overcorrelated pairs of said each target word and words in a plurality of documents, wherein an overcorrelated pair occurs when said each target word and a particular word in said plurality of documents have a first actual co-occurrence in portions of said plurality of documents that exceeds an expected probabilistic co-occurrence by at least a first threshold;
      wherein the first actual co-occurrence is determined by counting a number of blocks in said plurality of documents that contain both said each target word and the particular word;
   for said each target word of said target words and the set of the overcorrelated pairs determined for said each target word, determining overcorrelated triplets comprising said each target word and two words from said set of overcorrelated pairs, wherein an overcorrelated triplet occurs when said each target word and particular two words in said set of overcorrelated pairs have a second actual co-occurrence in said portions of said plurality of documents that exceeds said expected probabilistic co-occurrence by at least a second threshold;
      wherein said second actual co-occurrence is determined by counting a number of blocks in said plurality of documents that contain said each target word and the particular two words;
      wherein determining said overcorrelated triplet for said each target word and the particular two words comprises computing a ratio between said second actual co-occurence and a predicted proportion of blocks having said each target word and the particular two words;
   storing data representing the overcorrelated triplets determined for said target words on one or more storage devices; and
   wherein the method is performed by one or more computing devices.

2. The method of claim 1, wherein said first actual co-occurrence in said portions of said plurality of documents is determined for at least two blocks of a same document in said plurality of documents.

3. The method of claim 1, wherein said first actual co-occurrence in said portions of said plurality of documents is determined for an entire document in said plurality of documents.

4. The method of claim 1, further comprising determining a set of highly overcorrelated words based on said set of overcorrelated pairs from which said overcorrelated triplets were determined.

5. An apparatus comprising:
   one or more processors; and
   a non-transitory computer readable storage medium storing one or more instructions which, when executed by the one or more processors, cause the one or more processors to perform:
      for each target word of target words, determining a set of overcorrelated pairs of said each target word and words in a plurality of documents, wherein an overcorrelated pair occurs when said each target word and a particular word in said plurality of documents have a first actual co-occurrence in portions of said plurality of documents that exceeds an expected probabilistic co-occurrence by at least a first threshold;
         wherein the first actual co-occurrence is determined by counting a number of blocks in said plurality of documents that contain both said each target word and the particular word;
      for said each target word of said target words and the set of the overcorrelated pairs determined for said each target word, determining overcorrelated triplets comprising said each target word and two words from said set of overcorrelated pairs, wherein an overcorrelated triplet occurs when said each target word and particular two words in said set of overcorrelated pairs have a second actual co-occurrence in said portions of said plurality of documents that exceeds said expected probabilistic co-occurrence by at least a second threshold;
         wherein said second actual co-occurrence is determined by counting a number of blocks in said plurality of documents that contain said each target word and the particular two words;
         wherein determining said overcorrelated triplet for said each target word and the particular two words comprises computing a ratio between said second actual co-occurence and a predicted proportion of blocks having said each target word and the particular two words; and storing data representing the overcorrelated triplets determined for said target words on one or more storage devices.

6. The apparatus of claim 5, wherein said first actual co-occurrence in said portions of said plurality of documents is determined for at least two blocks of a same document in said plurality of documents.

7. The apparatus of claim 5, wherein said first actual co-occurrence in said portions of said plurality of documents is determined for an entire document in said plurality of documents.

8. The apparatus of claim 5, wherein the non-transitory computer readable storage medium further comprises instructions which, when executed by the one or more processors, cause the one or more processors to perform determining a set of highly overcorrelated words based on said set of overcorrelated pairs from which said overcorrelated triplets were determined.

9. A non-transitory computer-readable storage medium storing one or more sequences of instructions which, when executed by one or more processors, cause the one or more processors to perform:

for each target word of target words, determining a set of overcorrelated pairs of said each target word and words in a plurality of documents, wherein an overcorrelated pair occurs when said each target word and a particular word in said plurality of documents have a first actual co-occurrence in portions of said plurality of documents that exceeds an expected probabilistic co-occurrence by at least a first threshold;

wherein the first actual co-occurrence is determined by counting a number of blocks in said plurality of documents that contain both said each target word and the particular word;

for said each target word of said target words and the set of the overcorrelated pairs determined for said each target word, determining overcorrelated triplets comprising said each target word and two words from said set of overcorrelated pairs, wherein an overcorrelated triplet occurs when said each target word and particular two words in said set of overcorrelated pairs have a second actual co-occurrence in said portions of said plurality of documents that exceeds said expected probabilistic co-occurrence by at least a second threshold;

wherein said second actual co-occurrence is determined by counting a number of blocks in said plurality of documents that contain said each target word and the particular two words;

wherein determining an overcorrelated triplet for said each target word and the particular two words comprises computing a ratio between said second actual co-occurence and a predicted proportion of blocks having said each target word and the particular two words; and storing data representing the overcorrelated triplets determined for said target words on one or more storage devices.

10. The non-transitory computer-readable storage medium of claim 9, wherein said first actual co-occurrence in said portions of said plurality of documents is determined for at least two blocks of a same document in said plurality of documents.

11. The non-transitory computer-readable storage medium of claim 9, wherein said first actual co-occurrence in said portions of said plurality of documents is determined for an entire document in said plurality of documents.

12. The non-transitory computer-readable storage medium of claim 9, further comprising instructions which, when executed by the one or more processors, cause the one or more processors to perform determining a set of highly overcorrelated words based on said set of overcorrelated pairs from which said overcorrelated triplets were determined.

* * * * *